(12) United States Patent
Lochbihler et al.

(10) Patent No.: US 9,557,461 B2
(45) Date of Patent: Jan. 31, 2017

(54) TWO-DIMENSIONALLY PERIODIC, COLOR-FILTERING GRATING

(75) Inventors: Hans Lochbihler, Munich (DE); Manfred Heim, Bad Tolz (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 25 days.

(21) Appl. No.: 14/118,023

(22) PCT Filed: May 10, 2012

(86) PCT No.: PCT/EP2012/002014
§ 371 (c)(1),
(2), (4) Date: Nov. 15, 2013

(87) PCT Pub. No.: WO2012/156049
PCT Pub. Date: Nov. 22, 2012

(65) Prior Publication Data
US 2014/0085725 A1    Mar. 27, 2014

(30) Foreign Application Priority Data

May 16, 2011  (DE) .......................... 10 2011 101 635

(51) Int. Cl.
*G02B 5/20*  (2006.01)
*G02B 5/18*  (2006.01)
(Continued)

(52) U.S. Cl.
CPC ............... *G02B 5/203* (2013.01); *G02B 5/204* (2013.01); *G02B 5/1809* (2013.01); *G02B 5/286* (2013.01); *G02B 5/3058* (2013.01)

(58) Field of Classification Search
CPC ........................................... G02B 5/18–5/289
(Continued)

(56) References Cited

U.S. PATENT DOCUMENTS 1,184,226 A * 5/1916 Campbell ...................... 352/234
7,145,723 B2 12/2006 Tompkin et al.
(Continued)

FOREIGN PATENT DOCUMENTS

DE   102007016394 A1   10/2008
DE   102009012299 A1    9/2010
(Continued)

OTHER PUBLICATIONS

Barnes et al., "Surface plasmon subwavelength optics," Nature, Aug. 14, 2003, p. 824-830, vol. 424, Issue 6950.
(Continued)

*Primary Examiner* — Ricky Mack
*Assistant Examiner* — Kristina Deherrera
(74) *Attorney, Agent, or Firm* — Workman Nydegger (57) ABSTRACT

A two-dimensionally periodic, color-filtering grating has a contiguous high-refractive. In an embodiment, the color-filtering grating includes a metallic ground layer defining a grating plane and above the ground layer a two-dimensionally regular pattern of individual high-refractive, such as metallic areal elements that respectively extend parallel to the grating plane and respectively are spaced apart from the ground layer through an intermediate dielectric by a distance that is greater than the thickness of the ground layer and of the areal elements. The regular pattern has in at least two directions, which run parallel to the grating plane, a periodicity between 100 nm and 800 nm, and preferably between 200 nm and 500 nm.

15 Claims, 8 Drawing Sheets

(51) Int. Cl.
*G02B 5/28* (2006.01)
*G02B 5/30* (2006.01)

(58) Field of Classification Search
USPC ....... 359/558–576, 885–892, 485.05, 487.03
See application file for complete search history.

(56) References Cited

U.S. PATENT DOCUMENTS

| | | | |
|---|---|---|---|
| 8,067,723 | B2 | 11/2011 | Yamada et al. |
| 8,384,013 | B2 | 2/2013 | Yamada et al. |
| 2004/0095645 | A1* | 5/2004 | Pellicori et al. ............. 359/584 |
| 2004/0239099 | A1 | 12/2004 | Tompkin et al. |
| 2007/0081246 | A1* | 4/2007 | Stuck et al. .................. 359/568 |
| 2009/0226950 | A1 | 9/2009 | Cunningham et al. |
| 2009/0296246 | A1 | 12/2009 | Yamada et al. |
| 2010/0059663 | A1 | 3/2010 | Desieres |
| 2010/0091369 | A1* | 4/2010 | Hoose ........................... 359/568 |
| 2010/0177094 | A1 | 7/2010 | Kaule et al. |
| 2010/0328587 | A1 | 12/2010 | Yamada et al. |
| 2012/0014643 | A1 | 1/2012 | Bratkovski et al. |
| 2012/0038995 | A1 | 2/2012 | Yamada et al. |
| 2012/0206805 | A1* | 8/2012 | Meng .................... G02B 5/008 359/487.03 |
| 2012/0235399 | A1 | 9/2012 | Lochbihler |

FOREIGN PATENT DOCUMENTS

| | | |
|---|---|---|
| DE | 102009012300 A1 | 9/2010 |
| DE | 102009056933 A1 | 6/2011 |
| EP | 1434695 A | 7/2004 |
| EP | 2128665 A1 | 12/2009 |
| WO | 2010126493 A1 | 11/2010 |

OTHER PUBLICATIONS

Bravo-Abad et al., "How light emerges from an illuminated array of subwavelength holes," Nature Physics, Feb. 2006, p. 120-123, vol. 1.
Cheong et al., "High angular tolerant color filter using subwavelength grating," American Institute of Physics, Applied Physics Letters, May 26, 2009, p. 213104, vol. 94.
Cho et al., "Two-dimensional photonic crystal color filter development," Optics Express, May 7, 2009, vol. 17, No. 10, p. 8621-8629.
Cho et al., "Nanoimprinted photonic crystal color filters for solar-powered reflective displays," Optics Express, Dec. 16, 2010, vol. 18, No. 26, p. 27712-27722.
Ebbesen et al., "Extraordinary optical transmission through sub-wavelength hole arrays," Letters to Nature, vol. 391, Feb. 12, 1998, p. 667-669.
Huang et al., "Dual effect of surface plasmons in light transmission through perforated metal films," Phys. Rev., 2007, p. 245421, vol. B 75.
International Search Report for corresponding PCT Application No. PCT/EP2012/002014, mailed Aug. 6, 2012.
Lee et al., "Color filter based on a subwavelength patterned metal grating," Optics Express, Nov. 12, 2007, vol. 15, No. 23, p. 15457-15463.
Martin-Moreno et al., "Theory of extraordinary optical transmission through subwavelength hole arrays," Physical Review Letters, The American Physical Society, vol. 86, No. 6., Feb. 5, 2001, p. 1114-1117.
Ye et al., "Color filter based on a two-dimensional submicrometer metal grating," Applied Optics, Sep. 20, 2009, vol. 48, No. 27, p. 5035-5039.
Ye et al., "Color filter based on a submicrometer cascaded grating," Optics Communincation, vol. 283, 2010, p. 613-616.

* cited by examiner

TWO-DIMENSIONALLY PERIODIC, COLOR-FILTERING GRATING

BACKGROUND

The invention relates to a two-dimensionally periodic, color-filtering grating. For security elements of value documents one-dimensionally periodic gratings are known, for example from DE 102009012299 A1, DE 102009012300 A1 or DE 102009056933 A1. They may have color filter properties in the subwavelength region, when the grating profile is designed such that resonance effects emerge in the visible wavelength region. Such color filter properties are known both for reflective and for transmissive subwavelength structures. These structures have a strongly polarizing influence on the reflection or the transmission of an incident light beam. When the incident light is unpolarized, the color saturation for these gratings is considerably weakened. Further, the color in reflection or transmission of such subwavelength gratings is relatively strongly angular-dependent.

SUMMARY

In the scientific literature there are described two-dimensionally periodic hole structures that have filter properties of the incident light in the subwavelength region. In this respect reference is made to the following literature sources: T. W. Ebbesen, H. J. Lezec, H. F. Ghaemi, T. Thio, and P. A. Wolf, "Extraordinary optical transmission through sub-wavelength hole arrays", Nature, 667-669 (1998); L. Martín-Moreno, F. J. García-Vidal, H. J. Lezec, K. M. Pellerin, T. Thio, J. B. Pendry, and T. W. Ebbesen, "Theory of extraordinary optical transmission through subwavelength hole arrays", Phys. Rev. Lett. 86(6), 1114-1117 (2001); W. L. Barnes, A. Dereux, T. W. Ebbesen, "Surface plasmon subwavelength optics", Nature, Vol 424, Issue 6950, pp. 824-830 (2003); J. Bravo-Abad, A. Degiron, F. Przybilla, C. Genet, F. J. Garcia-Vidal, L. Martin-Moreno and T. W. Ebbesen "How light emerges from an illuminated array of subwavelength holes", Nature Physics 1, 120-123 (2006); H. S. Lee, Y. T. Yoon, S. S. Lee, S. H. Kim, and K. D. Lee, "Color filter based on a subwavelength patterned metal grating", Opt. Express 15, 15457-15463 (2007); C.-P. Huang, Q.-J. Wang, and Y.-y. Zhu, "Dual effect of surface plasmons in light transmission through perforated metal films", Phys. Rev. B 75, 245421 (2007). These so-called hole arrays comprise thin opaque metal films. In DE 102007016394 A1 it is proposed to employ such structures as a security element in value documents for authentication.

Furthermore, there are known two-dimensionally periodic gratings that allow a color filtering in primary colors red, green, blue at a high color saturation over a relatively large viewing angle region. The publication B.-H. Cheong, O. N. Prudnikov, E.-H. Cho, H.-S. Kim, Jaeho Yu, Young-Sang Cho, Hwan-Young Choi, and Sung Tae Shin, "High angular tolerant color filter using subwavelength grating", Appl. Phys. Lett. 94, 213104 (2009) describes a grating with cube-shaped elevations, which has a pronounced bandpass characteristic. The elevations are made of amorphous silicon and are located on a glass substrate. A replication method for such gratings is represented in the publications E.-H. Cho, H.-S. Kim, Byoung-Ho Cheong, Prudnikov Oleg, Wenxu Xianyua, Jin-Seung Sohn, Dong-Joon Ma, Hwan-Young Choi, No-Cheol Park, and Young-Pil Park, "Two-dimensional photonic crystal color filter development", Opt. Express 17, 8621-8629 (2009) and E.-H. Cho, H.-S. Kim, Jin-Seung Sohn, Chang-Youl Moon, No-Cheol Park, and Young-Pil Park, "Nanoimprinted photonic crystal color filters for solar-powered reflective displays", Opt. Express 18, 27712-27722 (2010). The publications Yan Ye, Yun Zhou, and Linsen Chen, "Color filter based on a two-dimensional submicrometer metal grating", Appl. Opt. 48, 5035-5039 (2009) and Yan Ye, Heng Zhang, Yun Zhou, and Linsen Chen, "Color filter based on a submicrometer cascaded grating", Opt. Commun., 283, 613-616 (2010) propose a two-dimensionally periodic grating for color filtering, in which the cube-shaped elevations are formed of aluminum and zinc sulphide or cube-shaped elevations of aluminum are located on a high-refractive layer. Hitherto, no practical manufacturing method has been known for such structures. In WO 2010/126493 A1 a grating with the same surface geometry is described. However, it exhibits no pronounced color filter properties. Finally, from EP 1434695 B1 two-dimensionally periodic gratings are known, which have light-absorbing properties. Due to a continuous metal film such structures do not have a perceptible light transmission. Likewise, no color-filtering properties are known.

The known two-dimensionally periodic subwavelength gratings having non-contiguous surface do show pronounced color filter properties at a great angular tolerance, but are very elaborate to manufacture. A simple replication method is not possible. Therefore, these structures are not suitable as security elements for value papers, in particular bank notes, because here a simple manufacturing in large numbers is required.

The invention is therefore based on the object to state a two-dimensional, color-filtering grating that has a good color filter property, on the one hand, and can be manufactured by cost-efficient duplicating methods, on the other hand.

This object is achieved according to the invention by a two-dimensionally periodic, color-filtering grating, which has a contiguous high-refractive, in particular metallic, ground layer that defines a grating plane and above the ground layer a two-dimensionally regular pattern of individual high-refractive, in particular metallic areal elements that respectively extend parallel to the grating plane and respectively are spaced apart from the ground layer through an intermediate dielectric by a distance that is greater than the thickness of the ground layer and of the areal elements, wherein the regular pattern has in at least two directions, which run parallel to the grating plane, a periodicity between 100 nm and 800 nm, preferably between 200 nm and 500 nm.

The grating provides a high-refractive ground layer as well as high-refractive areal elements that are arranged above the ground layer. The high-refractive property of the ground layer or of the areal elements is achieved by a suitable choice of material. In addition to metal as a material, in particular silicon, zinc sulphide or titanium dioxide come into consideration here. In this description the term "metallic" is to be understood to be synonymous with "high refractive", unless expressly described otherwise.

It is essential for the effect of the grating, that above a contiguous metallic layer there are arranged non-contiguous areal elements arranged in a pattern. When a two-dimensionally periodic grating having a profile, which possesses vertical flanks, is perpendicularly, metallically vapor-coated, a non-cohesive metal film arises on plateaux at the upper side of the grating. On the lower grating area (ground layer) a contiguous metal film is formed. The elevations of the profile are metallically covered here only on the plateaux.

The non-vapor-coated grating structure here consists of a dielectric material that has e.g. a refractive index of about 1.5. Here, in particular plastic foils, e.g. PET foils, are suitable as a substrate. The actual base structure is formed e.g. also in plastic, preferably UV lacquer. After the vapor coating, the structure is finally filled with UV lacquer and lined with a cover foil. Thus a layer composition is present, in which the upper and the lower side possess substantially the same refractive index.

Furthermore, the coating is not only restricted to simple metallic layers. Also multiple layers, in particular trilayers, are conceivable. It is known that multiply coated one-dimensionally periodic gratings enable a strong color filter filtering by the formation of Fabry-Perot resonators both in reflection and in transmission. In case of trilayers the following layers are particularly preferred: two semitransparent metal layers having an interjacent dielectric spacer layer or two high-refractive layers with an interjacent low-refractive layer. For the metal layers the following materials come into consideration: Al, Ag, Pt, Pd, Au, Cu, Cr and alloys thereof. As high-refractive layers for example ZnS, ZnO, $TiO_2$, ZnSe, SiO, $Ta_2O_5$ or silicon are suitable. As low-refractive layers $SiO_2$, $Al_2O_3$ or $MgF_2$ are possible.

In a particularly expedient manufacturing method, first a dielectric as a base structure is suitably structured and then coated. Then the ground layer has an opening in the region below each areal element. This is at the same time advantageous, because then also in transmission an optical effect arises.

It is preferred, that the grating is embedded in an embedding dielectric, which preferably has the same refractive index as the dielectric that forms the base structure and spaces the ground layer from the areal elements. The refractive index can lie for example between 1.4 and 1.6.

It has been found, that the color effects of the two-dimensional color-filtering grating depend on the periodicity of the pattern. This can be exploited for producing color symbols or images. For this purpose, the area fill factor and/or the distance between areal elements and ground layer can be locally varied. It is in particular possible to design a group of several areal elements having identical dimensions in such a way that a desired color effect occurs. This group then forms a subpixel. Several subpixels are configured with different color properties by corresponding geometric design and then combined into a pixel. This allows a color image representation. The different colors can here be varied by corresponding local variation of one or several of the parameters of the grating (distance of the areal elements in two spatial directions as well as distance of the areal elements from the ground layer).

By the color mixture of basic colors, e.g. RGB colors, pixel by pixel in subpixel regions true color images can be produced. The advantage of such structures is, compared to the conventional printing technique, that in doing so a very fine structuring up into the micrometer region can be performed. This fine structuring is particularly suitable for uses in moiré magnification arrangements, e.g. by the grating being formed such that it provides microimages for moiré magnification arrangements. In microlens arrangements the great angular tolerance of the above-described two-dimensionally periodic gratings has a very advantageous effect, because the microlenses in moiré magnification arrangements have a small focal distance at a relative great aperture ratio. Therefore, the structures described herein show a greater color saturation in combination with microlenses than hitherto known one-dimensionally periodic subwavelength structures.

The two-dimensionally periodic grating can be employed in particular in a security element for a value document. It can in particular be integrated in a security thread, tear thread, security band, security strip, patch or label. In particular, the security element provided with the grating can span transparent regions or recesses.

The grating as a security element in particular can be part of a precursor to a value document yet unfit for circulation, which can have further authenticity features. Value documents, on the one hand, are understood to be documents that are provided with the two-dimensional grating. On the other hand, value documents can also be other documents or objects that are provided with the two-dimensional grating, in order for the value documents to have uncopiable authenticity features, so as to enable an authenticity check and to prevent unwanted copies. Chip or security cards, such as e.g. bank or credit cards or identification documents, are further examples of a value document.

It is obvious, that the features mentioned hereinabove and those to be explained hereinafter are usable not only in the stated combinations, but also in other combinations or in isolation, without going beyond the scope of the present invention.

BRIEF DESCRIPTION OF THE DRAWINGS

Hereinafter the invention will be explained more closely by way of example with reference to the attached drawings, which also disclose features essential to the invention. There are shown.

DETAILED DESCRIPTION OF VARIOUS EMBODIMENTS

Figure 1:
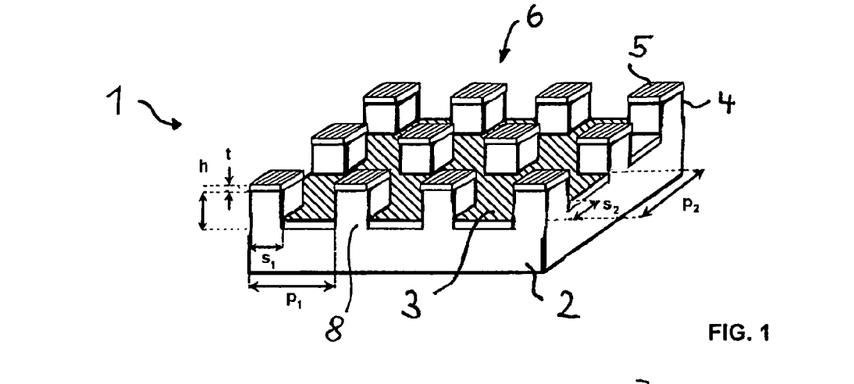
FIG. 1 a perspective schematic representation of a first embodiment of a color-filtering grating, FIG. 2 a development of the grating of FIG. 1, FIG. 3 a modification of the grating of FIG. 2, FIG. 4-5 schematic representations for illustrating the mode of function of the color-filtering grating, FIG. 6 a development of the grating of FIG. 3, FIG. 7-11 diagrams with respect to the filter properties of various color-filtering gratings, FIG. 12 a schematic representation for illustrating a color-filtering grating for image representation, FIG. 13-15 diagrams regarding the filter properties of various color-filtering gratings.

FIG. 1 shows a color-filtering grating 1, which can be employed for example as a security element in a value document. The color-filtering grating 1 is manufactured in that a carrier 2 is provided with a profile that possesses perpendicular flanks. The carrier 2 then represents a base structure. The profile is formed such that on an upper side of the carrier 2 a pattern 6 is formed by columns 4. The carrier is made of a dielectric and was coated with a metal layer 3, which deposits in a ground layer 3 on the surface of the carrier 2 as well as in a coating 5 on the columns 4. Due to the perpendicular flanks, these are not coated.

In the pattern 6 the columns 4, which here merely by way of example are formed in cuboid fashion and can be, inter alia, cylindrical (not necessarily circular cylindrical) elevations, are arranged in the form of a two-dimensionally periodic grating, wherein along two mutually perpendicular directions in the grating plane of the grating, which is defined by the ground layer 3, periodicities $p_1$ and $p_2$ are present. The extensions of the columns 4 or of the elevations in the ground plane are referred to as $s_1$ and $s_2$. The ground layer 3 as well as the coatings 5 have a layer thickness t. The coatings 5 arranged in the pattern 6 are spaced apart from the upper side of the ground layer 3 through the height h of the columns 4 by the distance h–t. The column height h of the profiled carrier 2 is greater than the layer thickness t, so that the metal layer is interrupted and the coatings 5 are not contiguous. There thus arises a metal structure that consists of the ground layer 3 that defines the grating plane above which the coatings 5 are located. The distance between the coatings 5 and the ground layer 3 is here effected by the dielectric columns 4.

The periodicities $p_1$ and $p_2$ lie in the subwave region, i.e. in the region between 100 nm and 800 nm, preferably between 200 nm and 450 nm or 600 nm. The fill factors $s_1/p_1$ and $s_2/p_2$ lie between 0.2 and 0.8, preferably between 0.3 and 0.7. So as to achieve a polarization-independent color filtering, the profile parameters for the two spatial directions are chosen identically if possible, i.e. $p_1=p_2$ and $s_1=s_2$. But this is optional. Likewise, in the described embodiment example the periodicity directions are mutually perpendicular. This, too, is optional. Spatially asymmetric arrangements of the profile and of the periodicities are also conceivable. In other words, the pattern 6 does not have to be a Cartesian pattern, as represented in FIG. 1. The columns 4 can also be designed asymmetric.

Figure 2:
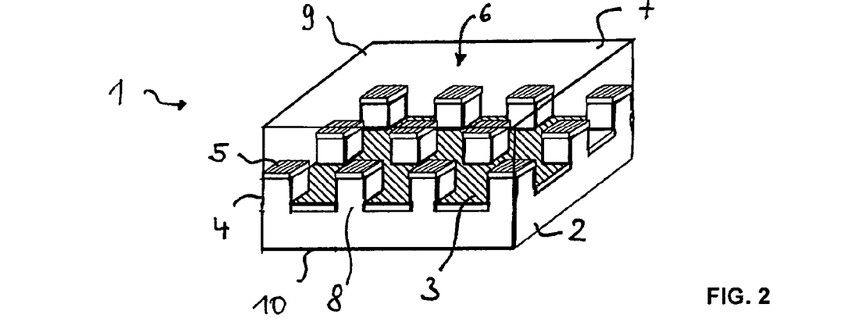

FIG. 2 shows a development, in which the pattern 6 is embedded in a embedding dielectric 7. This has in particular advantages upon the application, because then the surface of the grating 1 is smooth.

Figure 3:
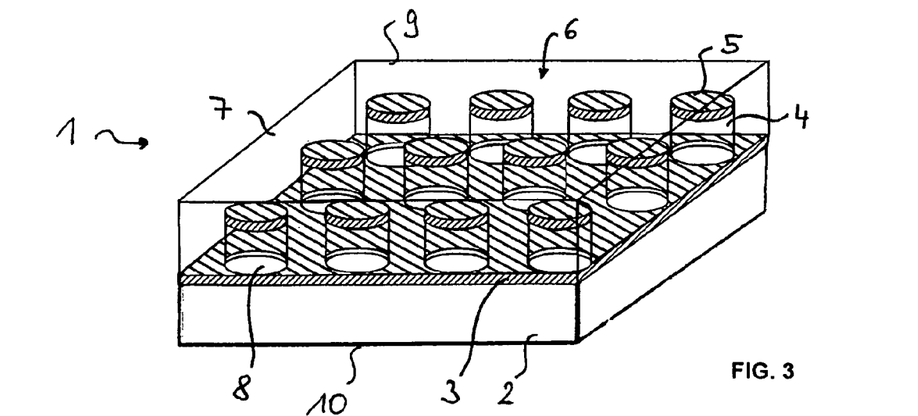

FIG. 3 shows a grating 1, whose columns 4 are formed circular cylindrical. This form is particularly suitable, as the construction of the FIG. 1 or 2, for color filters for unpolarized light. Modifications of the square form of FIG. 1 or of the circular form of FIG. 3 are also possible, e.g. by for example rounded corners.

Figure 4:
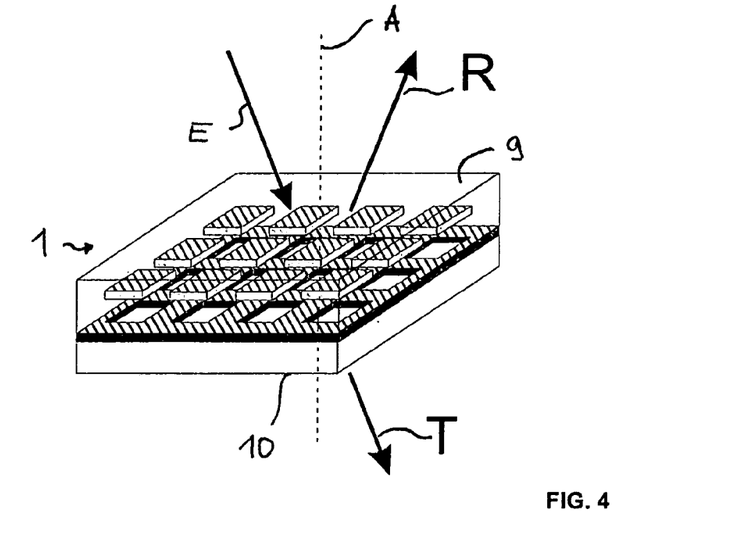
Figure 5:
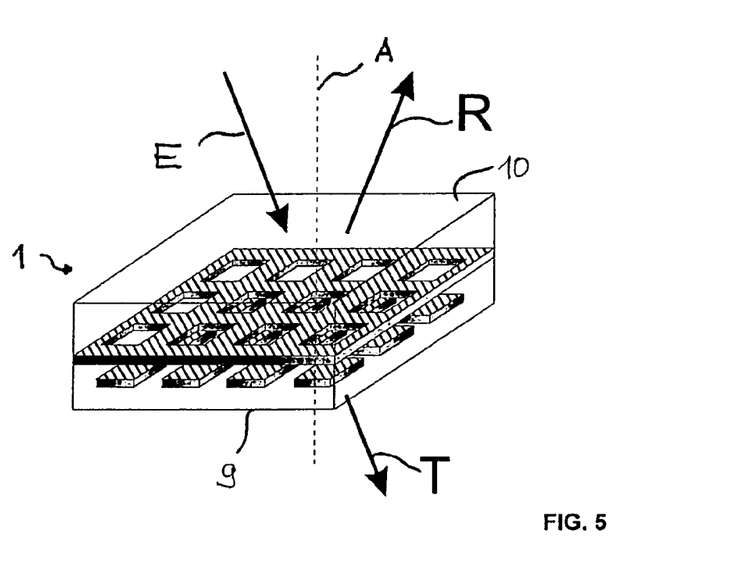

The FIGS. 3 and 4 show the principle of operation of the grating 1 in the example of the construction of FIG. 2. FIG. 4 shows the situation, when radiation E is incident on the upper side 9 of the grating. In FIG. 5 the incidence is shown from the lower side 10. The grating 1 reflects incident radiation E in the form of reflected radiation R and transmits a part as transmitted radiation T. The substantial difference between the illumination from the upper side 9 and the lower side 10 is that from the upper side 9 the incident radiation E first falls onto the periodic coating 5 arranged in the pattern 6. From the lower side 10, however, the pattern of the holes 8 in the ground layer 3 is directly illuminated. This difference has considerable consequences in the reflection behavior, in particular with respect to the color impression.

By the metal layer being applied onto the structured carrier 2, under the coatings 5, i.e. in the region of the columns 4, the ground layer 3 is provided with openings 8. The grating 1 thus has a hole array in the metal layer 3, the arrangement of the openings 8 being defined by the pattern 6. In case of completely perpendicular flanks of the column 4, arrangement and sizes of the openings 8 correspond exactly to those of the coatings 5. The ground layer 3 of the construction of the FIGS. 4 to 5, however, can also be supplemented or replaced by multiple layers. In particular triple layers (so-called trilayers) are possible.

Is it known that multiply coated one-dimensionally periodic gratings enable a strong color filter filtering by the formation of Fabry-Perot resonators both in reflection and in transmission. In case of trilayers for ground layer 11 and/or areal elements 12 (e.g. structures), the following layers are particularly preferred: two semitransparent metal layers having an interjacent dielectric spacer layer or two high-refractive layers with an interjacent low-refractive layer. For the metal layers the following materials come into consideration: Al, Ag, Pt, Pd, Au, Cu, Cr and alloys thereof. For example, $ZnS$, $ZnO$, $TiO_2$, $ZnSe$, $SiO$, $Ta_2O_5$, or silicon are suitable as high-refractive layers. $SiO_2$, $Al_2O_3$, or $MgF_2$ are expedient as low-refractive layers.

Many different processes come into consideration for the manufacturing method of the gratings 1. The manufacturing is the simplest, when first the dielectric carrier 2 having the elevations, for example columns 4, arranged in the pattern 6 is formed as a base structure and then coated. This can be done perpendicular as well as in oblique vapor coating. It is essential, that the coatings 5 are not contiguous, i.e. are individual.

For the manufacturing of the carrier 2 a molding method is possible, so that a cost-efficient mass production can be realized.

Metallic security elements with optically active embossings are already prior art. The embossings are greater than the wavelength and mostly are present in an embossing lacquer that is covered with a metal layer. Such security elements are employed in three different variants: security threads, security foils embedded in paper and provided with effect layers, transfer strip (or patch) with which only an embossing lacquer coated with effect layers is transferred onto the substrate, and laminate foils, foils provided with effect layers and bonded to the substrate.

A color configuration of these security elements can be done in the following way: Coloring the carrier foils or the embossing lacquer, partially printing a glazing ink beneath the embossing lacquer, partially printing a glazing ink above the metal coating, or embossing diffractive elements, a giving of color being done via the first diffraction order (e.g. true-color holograms).

The above-mentioned procedures have significant disadvantages in the case of security elements: colored carrier foils can only be employed for security threads and laminate foils. Only one color can be rendered here. Furthermore, in security elements there are often present transparent regions that are to appear colorless. Colored embossing lacquers likewise do not allow the security elements to be configured with clear transparent regions, since the embossing lacquer is always present over the full area. A multicolor configuration is likewise not possible. Transfer elements can be designed in color for example with a glazing ink beneath the embossing lacquer. This includes the problem that the glazing ink must enter into a good adhesive connection with the embossing lacquer, on the one hand. The adhesion to the carrier foil, onto which it is printed, may only be very small, so as to not impair the transfer process, on the other hand. A further disadvantage is the poor register accuracy of such a printed ink layer relative to the effect embossings. Since color print layers are not simultaneously produced in the same operational step with the embossings, there arise deviations in the position of the two layers relative to each other. Therefore, within such a motif the colored partial areas are often shifted by several tenths of a millimeter relative to the embossed motif. With a giving of color by diffractive structures, the above-mentioned disadvantages are avoided. But the color of these first-order diffractive structures very strongly depends on the viewing angle. A security element must be held in the correct angle with respect to the light source, so as to see it in the color that corresponds to the design. In all other viewing situations it appears in other colors. Furthermore, the intensity of the first diffraction order of these structures is mostly lower in comparison to the reflection of printed inks.

The grating 1 described here achieves the giving of color e.g. to security elements by a two-dimensionally periodic subwavelength structure in the zeroth diffraction order. By the high angular tolerance of the color tone and the possibility of the lateral structuring of the grating profile all the above-mentioned disadvantages can be avoided. The color-giving embossed structures are of intensive color, can be arranged in accurately positioned fashion relative to other embossed security structures, and appear in the desired uniform color tone at a relatively broad viewing angle.

The embossed structures can here completely fill particular area regions of the design and thus produce a color image, on the one hand, or they can impart a color to other embossed effect structures by being interlaced with the other embossed effect structures in alternating small area segments. The color-giving embossed structures can also be overlaid by other embossed effect structures. This is possible in particular because many embossed effect structure individual structures employed in security elements are of a size between 700 nm and 20 μm and thus can be overlaid without interference with the color-giving embossed structures, which typically are smaller by at least a factor of 2-10.

Finally, the above-described structure can be integrated into a security foil in a see-through region. Upon viewing in incident light from the front side and back side this feature appears in different colors. The transmission of this see-through element can differ from the reflection in terms of color.

TABLE 1

Parameters of two-dimensionally periodic gratings

| Structure | p [nm] | s [nm] | h [nm] | t [nm] |
|---|---|---|---|---|
| a) | 400 | 120 | 300 | 40 |
| b) | 240 | 117 | 300 | 40 |
| c) | 330 | 167 | 300 | 40 |
| d) | 400 | 203 | 310 | 40 |
| e) | 240 | 117 | 300 | 20 |
| f) | 240 | 117 | 300 | 50/45/50 |

All the above-specified gratings were molded on PET foils in UV lacquer, vapor-coated with aluminum and subsequently lined with a PET foil. The refractive index of the PET foil as well as that of the UV lacquer amounts to about 1.56 in the visible.

Figure 7:
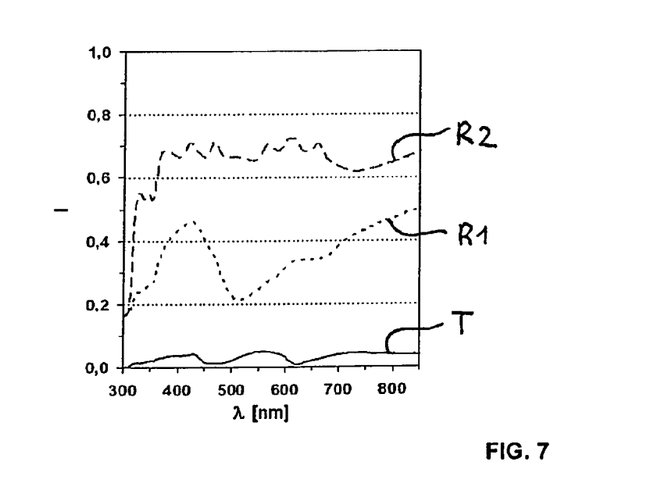
Figure 8:
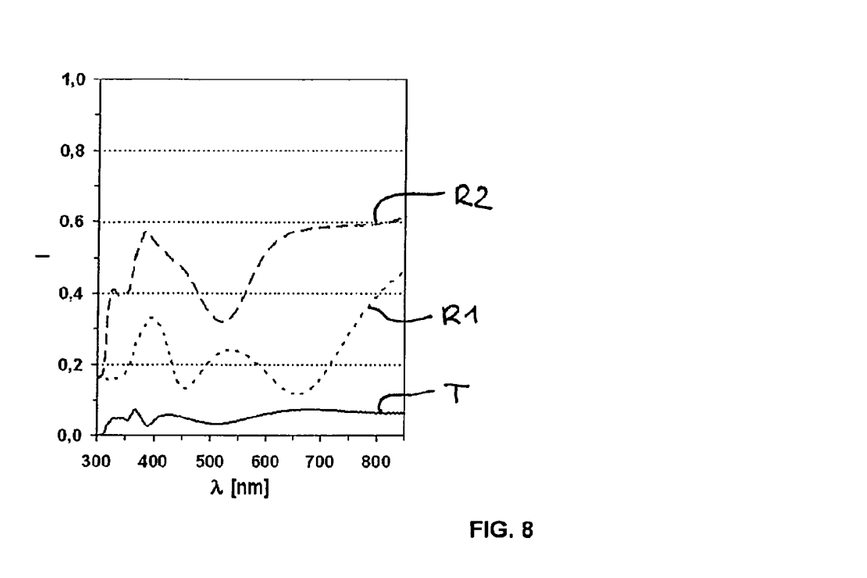
Figure 9:
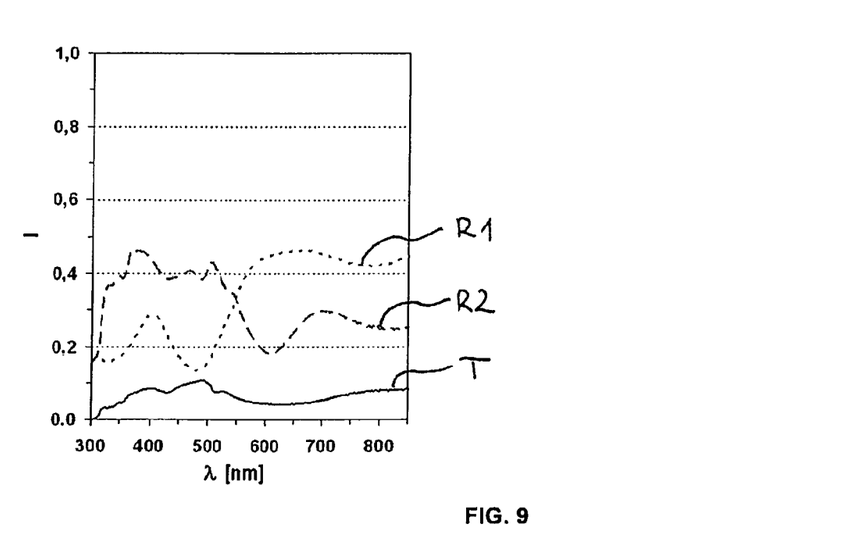
Figure 10:
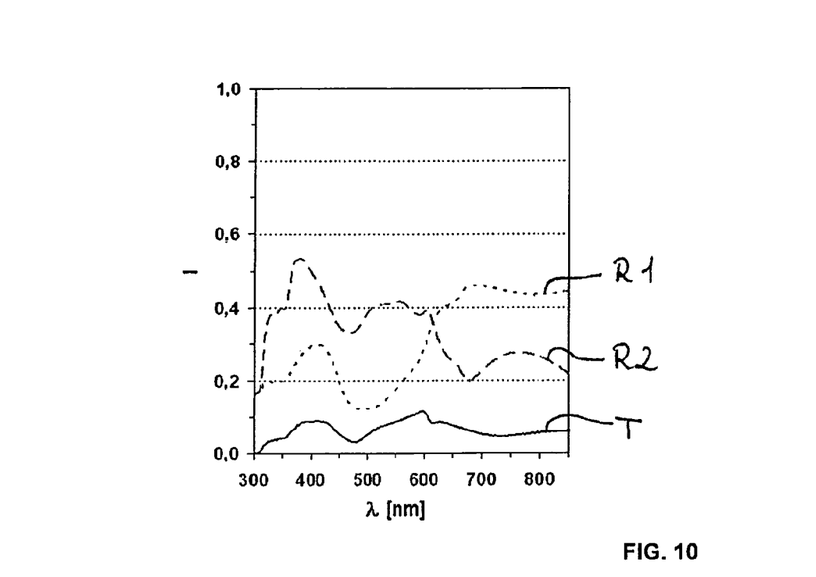

FIG. 7 shows transmission or reflection behaviors from the structures designated as a to d in the above table. Here, R1 designates the course of the reflection on the front side, R2 the course of the reflection on the back side, and T the transmitted radiation. The FIGS. 7-11 respectively show the intensity as a function of the wavelength. Aluminum with a layer thickness t of 40 nm has been employed as a metal.

Figure 11:
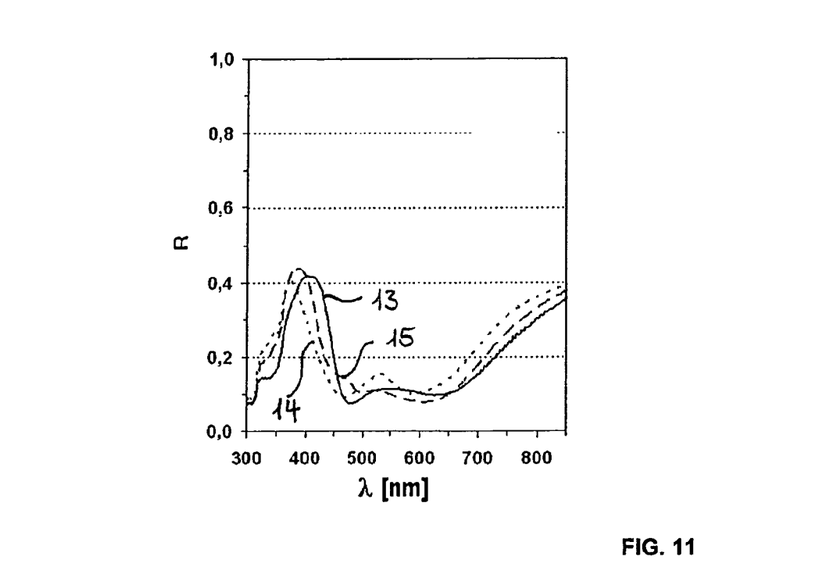

These gratings show different colors in reflection and in transmission. The reflection on the front side considerably differs from the reflection on the back side. This becomes most evident with the gratings c) and d). The grating c) has a red color tone on the front side, while the back side appears blue. The transmission, however, upon viewing from both sides, is blue. The grating d), however, appears reddish on the front side, turquoise on the back side, and green in transmission. The angular tolerance of the color tone was examined by reflection measurements at different angles of incidence. FIG. 11 shows the reflection of the grating e) for the angles of incidence 8° (curve 13), 30° (curve 15) and 45° (curve 14). The reflection maximum for this grating lies in the blue and is shifted only slightly upon variation of the angle of incidence. The grating always appears blue at these different angles of incidence.

Figure 12:
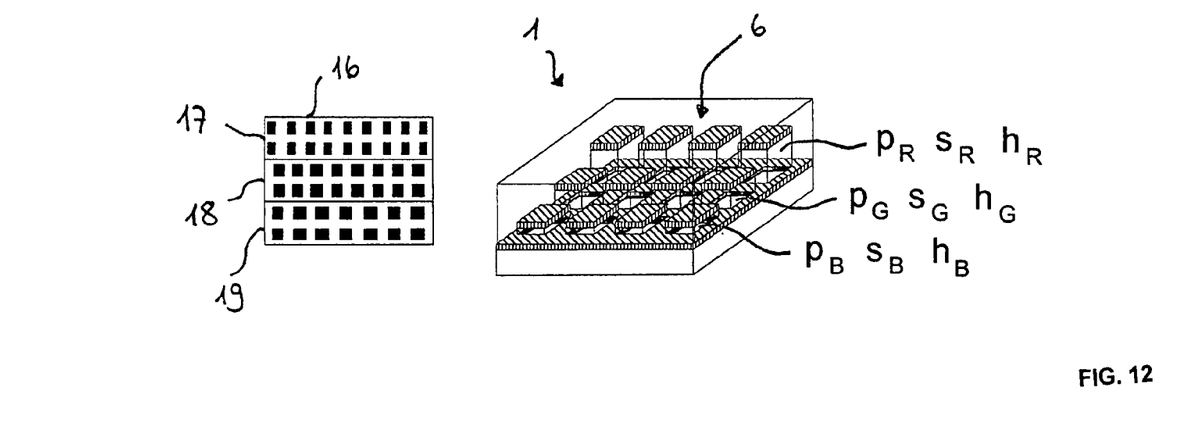

The above-described profile-dependent giving of color can be used to produce color symbols or images. FIG. 12 shows three regions of a grating with different profiles ($p_R$, $s_R$, $h_R$), ($p_G$, $s_G$, $h_G$) or ($p_B$, $s_B$, $h_B$), which appear in the colors red, green and blue. These different colors can be caused by correspondingly varying one or several profile parameters.

The three regions 17, 18, 19 correspond to RGB subpixels and together form a pixel 16. In each region 17, 18, 19 the respective profile ensures that the corresponding colors red, green or blue are effected. At the same time, by the selection of the profile the portion of the color of the respective RGB subpixel that is formed by the region 17, 18 or 19 can be adjusted in the pixel 16. There can thus be imparted a desired color to the pixel 16. Thus, by the color mixture, which is effected in the pixel 16, of the primary colors in the regions 17, 18, 19 of the RGB subpixels, true color images become possible. The advantage of such a structure compared to a conventional printing technique is that a very fine structuring up into the micrometer region is possible, which is advantageous in particular with magnification arrangements. The grating according to FIG. 12 allows microimages in which the grating profile changes laterally in order to achieve a contrast in terms of color or intensity in the microimage. The structure described herein is particularly suitable therefor, because its optical properties are very angle-tolerant, i.e. its color hardly changes upon a variation of the angle of incidence. This property is advantageous in case of a combination with microlens arrays, because the light perceived by a viewer comes from different light paths that have different angles of incidence.

Figure 13:
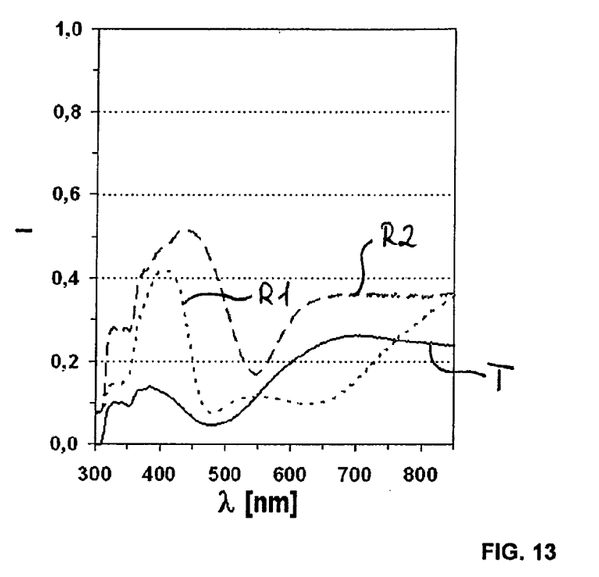

FIG. 13 shows transmission or reflection behaviors of the grating according to structure a.

Figure 6:
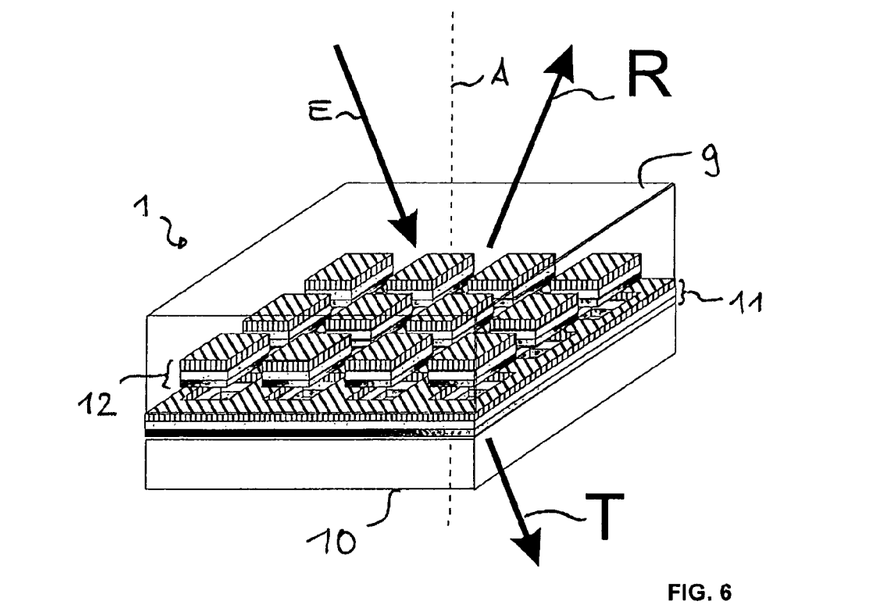
Figure 14:
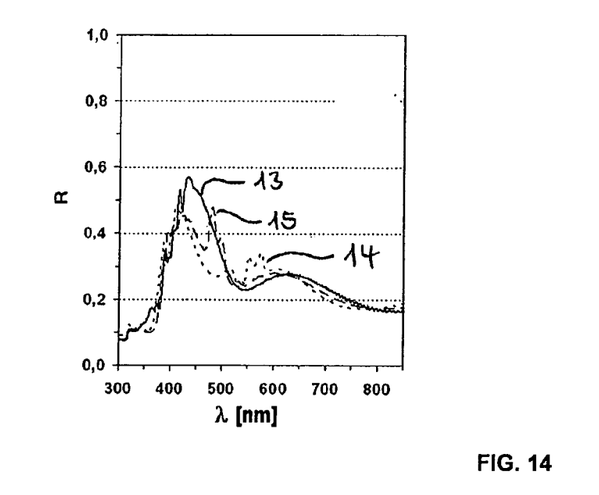
Figure 15:
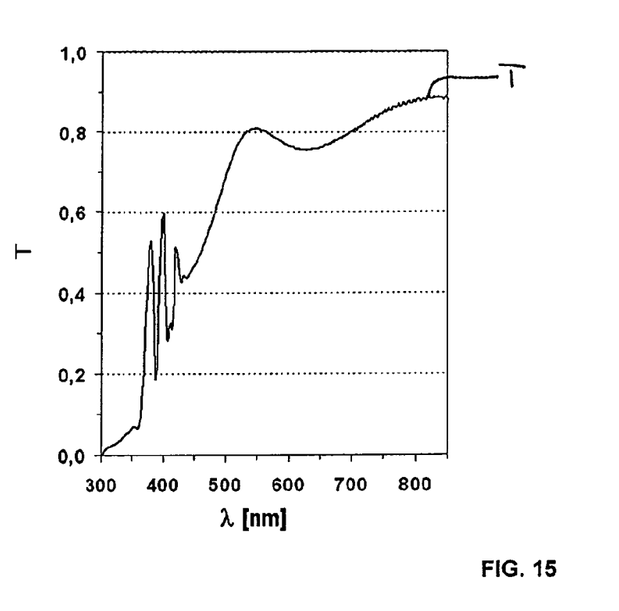

If the grating having the trilayer coating according to FIG. 6 is employed, the optical properties according to FIGS. 14 and 15 are obtained. The trilayer coating here has a sequence of 50 nm ZnS, 45 nm $SiO_2$ and 50 nm ZnS. This grating shows an angular-independent blue color tone in reflection and a yellow color tone in transmission. It corresponds to the structure f of the table above.

It is self-evident that in the above description the terms "above" or "below" are to be understood merely by way of example and to be related to the representation in the drawings. Of course, the composition can also be inverted to the effect that the construction of the FIG. 5 is taken as the base, i. e. the coatings 5 are then located below the ground layer 3. This has then a particular effect, if by applying the grating onto a not transparent material merely reflected radiation contributes to the optical effect.

LIST OF REFERENCE SIGNS 1 grating
2 carrier
3 ground layer
4 column
5 coating
6 pattern
7 dielectric
8 opening
9 front side
10 back side
11, 12 multilayer composition
13, 14, 15 curve
16 pixel
17, 18, 19 RGB subpixel
h column height t coating thickness
$s_1$ column width
$s_2$ column depth
$p_1$, $p_2$ period
A surface normal
E incident radiation
R reflected radiation
R1 radiation reflected on the front side
R2 radiation reflected on the back side
T transmitted radiation

The invention claimed is:

1. A two-dimensionally periodic, color-filtering grating, comprising a contiguous high-refractive metallic ground layer defining a grating plane and above the ground layer a two-dimensionally regular pattern of individual high-refractive including metallic areal elements that respectively extend parallel to the grating plane and respectively are spaced apart from the ground layer through an intermediate dielectric by a distance greater than the thickness of the ground and of the areal elements, wherein the ground layer has an opening below each areal element, wherein the regular pattern has in at least two directions, which run parallel to the grating plane, a periodicity between 100 nm and 800 nm, wherein the metallic ground layer and metallic areal elements include trilayers having two semitransparent metal layers and an interjacent dielectric spacer layer.

2. The color-filtering grating according to claim 1, wherein the ground layer and the areal elements comprise a material that contains one or more of Al, Ag, Cu, Cr, Si, Zn, Ti, Pt, Pd, Ta and an alloy therefrom.

3. The color-filtering grating according to claim 1, wherein the intermediate dielectric below each areal element is formed as a column, on which the areal element is arranged, and has a refractive index between 1.4 and 1.6.

4. The color-filtering grating according to claim 1, wherein the color-filtering grating is embedded in an embedding dielectric having the same refractive index as the intermediate dielectric.

5. The color-filtering grating according to claim 1, wherein the regular pattern of the areal elements has an area fill factor of 0.15 to 0.85.

6. The color-filtering grating according to claim 5, wherein the areal element has an area fill factor of 0.3 to 0.7.

7. The color-filtering grating according to claim 1, wherein the distance at which the areal elements lie above the grating plane varies parallel to the grating plane.

8. The color-filtering grating according to claim 1, wherein the color-filtering grating has a dielectric carrier layer, whose upper side is structured into a column structure having flanks that run perpendicular to the grating plane and onto which a high-refractive layer is applied such that the flanks are not completely coated.

9. The color-filtering grating according to claim 1, wherein the color-filtering grating for producing color image information has a local variation of area fill factor and/or distance between areal elements and ground layer.

10. The color-filtering grating according to claim 9, wherein the color-filtering grating provides a microimage structure for a moiré magnification arrangement.

11. The color-filtering grating according to claim 1, wherein the periodicity is between 200 nm and 500 nm.

12. The color-filtering grating according to claim 1, wherein one or more of the metallic ground layer and the areal elements are embossed.

13. The color-filtering grating according to claim 12, wherein the areal elements are configured to impart color to each other by having alternating colored embossed small area segments.

14. The color-filtering grating according to claim 1, wherein the openings in the ground layer are directly under each areal element.

15. The color-filtering grating according to claim 1, wherein the opening under each areal element is defined on all sides by the ground layer.

* * * * *